United States Patent
Moussaoui et al.

(10) Patent No.: US 8,570,006 B2
(45) Date of Patent: Oct. 29, 2013

(54) DEVICE AND METHOD FOR CONTROLLING A BUCK-BOOST CONVERTER

(75) Inventors: Zaki Moussaoui, San Carlos, CA (US); Jun Liu, Sunnyvale, CA (US)

(73) Assignee: Intersil Americas Inc., Milpitas, CA (US)

( * ) Notice: Subject to any disclaimer, the term of this patent is extended or adjusted under 35 U.S.C. 154(b) by 177 days.

(21) Appl. No.: 13/303,702

(22) Filed: Nov. 23, 2011

(65) Prior Publication Data
US 2013/0021015 A1    Jan. 24, 2013

Related U.S. Application Data

(60) Provisional application No. 61/510,474, filed on Jul. 21, 2011.

(51) Int. Cl.
*G05F 1/40*    (2006.01)

(52) U.S. Cl.
USPC ............ 323/266; 323/222; 323/282; 363/16; 363/17; 363/97; 363/98; 363/131; 363/132

(58) Field of Classification Search
USPC .......... 363/16, 17, 97, 98, 131, 132; 323/266, 323/222, 282
See application file for complete search history.

(56) References Cited

U.S. PATENT DOCUMENTS

| | | | | |
|---|---|---|---|---|
| 7,567,443 | B2 * | 7/2009 | Shiga et al. | 363/17 |
| 7,986,172 | B2 * | 7/2011 | Sicard | 327/108 |
| 2007/0076446 | A1 * | 4/2007 | Shiga et al. | 363/17 |
| 2007/0285951 | A1 * | 12/2007 | Bien | 363/16 |
| 2011/0050322 | A1 * | 3/2011 | Sicard | 327/419 |

* cited by examiner

*Primary Examiner* — Bao Q Vu
(74) *Attorney, Agent, or Firm* — Fogg & Powers LLC (57) ABSTRACT

A circuit, device, and method for controlling a buck-boost circuit includes a bootstrap capacitor voltage regulator circuit and a comparator circuit. The bootstrap capacitor voltage regulator circuit is electrically coupled to a buck-mode bootstrap capacitor of the buck-boost converter and to a boost-mode bootstrap capacitor of the buck-boost converter. The comparator circuit is configured to control the bootstrap capacitor voltage regulator circuit to maintain a voltage of the bootstrap capacitors above a reference threshold voltage by transferring an amount energy from one of the bootstrap capacitors to the other bootstrap capacitors based on the particular mode of operation of the buck-boost converter.

20 Claims, 7 Drawing Sheets

DEVICE AND METHOD FOR CONTROLLING A BUCK-BOOST CONVERTER

CROSS-REFERENCE TO RELATED U.S. PATENT APPLICATION

The present application claims priority under 35 U.S.C. §119(e) to U.S. Provisional Application Ser. No. 61/510,474, entitled "Device and Method for Controlling a Buck-Boost Converter," which was filed on Jul. 21, 2011, the entirety of which is hereby incorporated by reference.

DETAILED DESCRIPTION

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Some embodiments of the disclosure, or portions thereof, may be implemented in hardware, firmware, software, or any combination thereof. Embodiments of the disclosure may also be implemented as instructions stored on a tangible, machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Many electrical devices require voltages of varying magnitudes to power individual circuits and/or components of the device. To facilitate such requirements, a DC converter may be used to convert an input voltage to an output voltage having a magnitude different from the input voltage. For example, a boost converter may be used to convert the input voltage to an output voltage having a magnitude greater than the input voltage. Conversely, a buck converter may be used to convert the input voltage to an output voltage having a magnitude less than the input voltage. Alternatively, a buck-boost converter may be used to convert the input voltage to an output voltage having a magnitude that is greater than or less than the input voltage depending on the particular voltage requirements of the electrical device.

Figure 1:
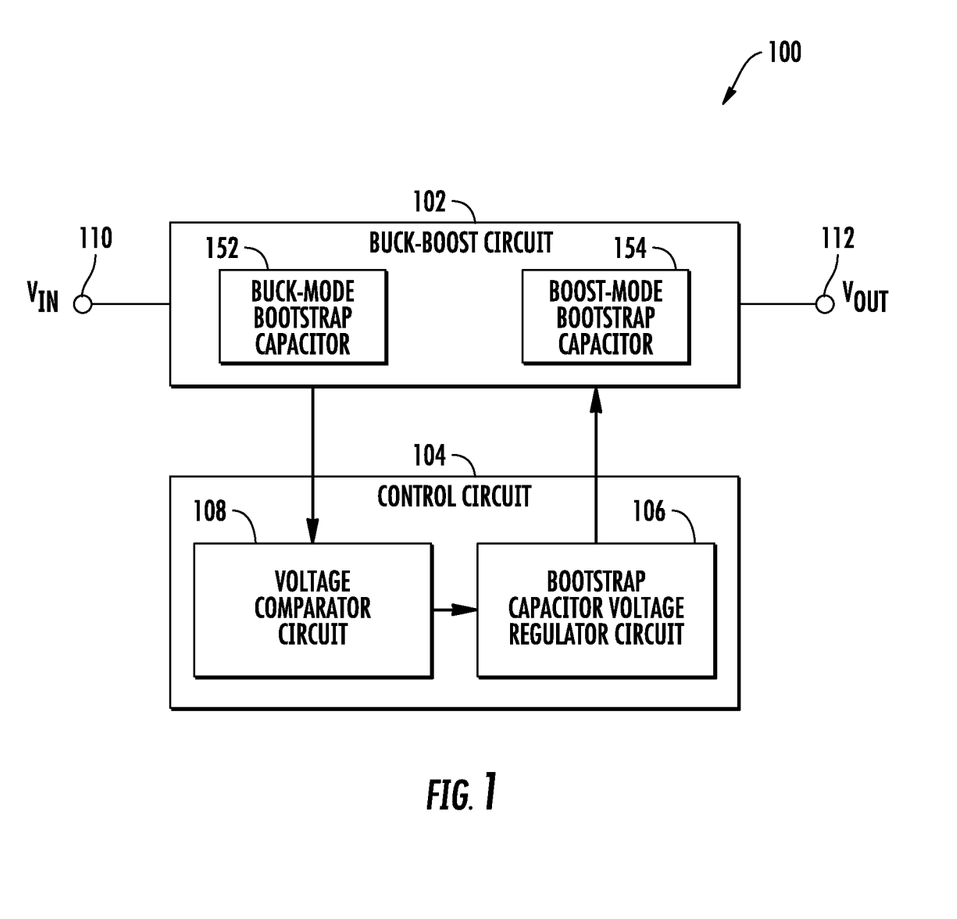
FIG. 1 is a simplified block diagram of one embodiment of a converter to convert an input voltage to an output voltage having a greater or lesser magnitude.

Referring now to FIG. 1, in one embodiment, a converter 100 for converting an input voltage to an output voltage having a magnitude different from the input voltage includes a buck-boost circuit 102 and a control circuit 104 electrically coupled to the buck-boost circuit 102 to control the operation thereof. The buck-boost circuit 102 includes an input 110 to receive an input voltage, Vin, and an output 112 at which an output voltage, Vout, is generated. The buck-boost circuit 102 is configured to convert the input voltage, Vin, received at an input 110 to the output voltage, Vout, at an output 112. Depending on whether the buck-boost circuit 102 is operating in a boost mode or a buck mode, the output voltage, Vout, may have a magnitude that is greater than or less than the input voltage, Vin.

The buck-boost circuit 102 also includes a buck-mode bootstrap capacitor 152 and a boost-mode bootstrap capacitor 154. As discussed in more detail below, the bootstrap capacitors 152, 154 maintain nodal voltages of the buck-boost circuit 102 at desired levels to facilitate switching during the buck and boost modes of operation. To do so, the voltages of the bootstrap capacitors 152, 154 are monitored and maintained by the control circuit 104.

The control circuit 104 includes a voltage comparator circuit 108 and a bootstrap capacitor voltage regulator circuit 106. During operation, the voltage comparator circuit 108 is configured to sense or otherwise measure the voltage of the bootstrap capacitors 152, 154. Based on such voltage measurements, the voltage comparator circuit 108 controls the operation of the bootstrap capacitor voltage regulator circuit 106 to transfer energy between the bootstrap capacitors 152, 154 during buck mode and/or boost mode so as to maintain the voltages of the bootstrap capacitors 152, 154 above a reference level. The control circuit 104 also generates various switching signals to control the operation of other electronic switches of the buck-boost circuit 102. For example, the control circuit 104 generates the switching signals to control the mode (i.e., buck mode or boost mode) of the buck-boost circuit 102 as discussed in more detail below.

Figure 2:
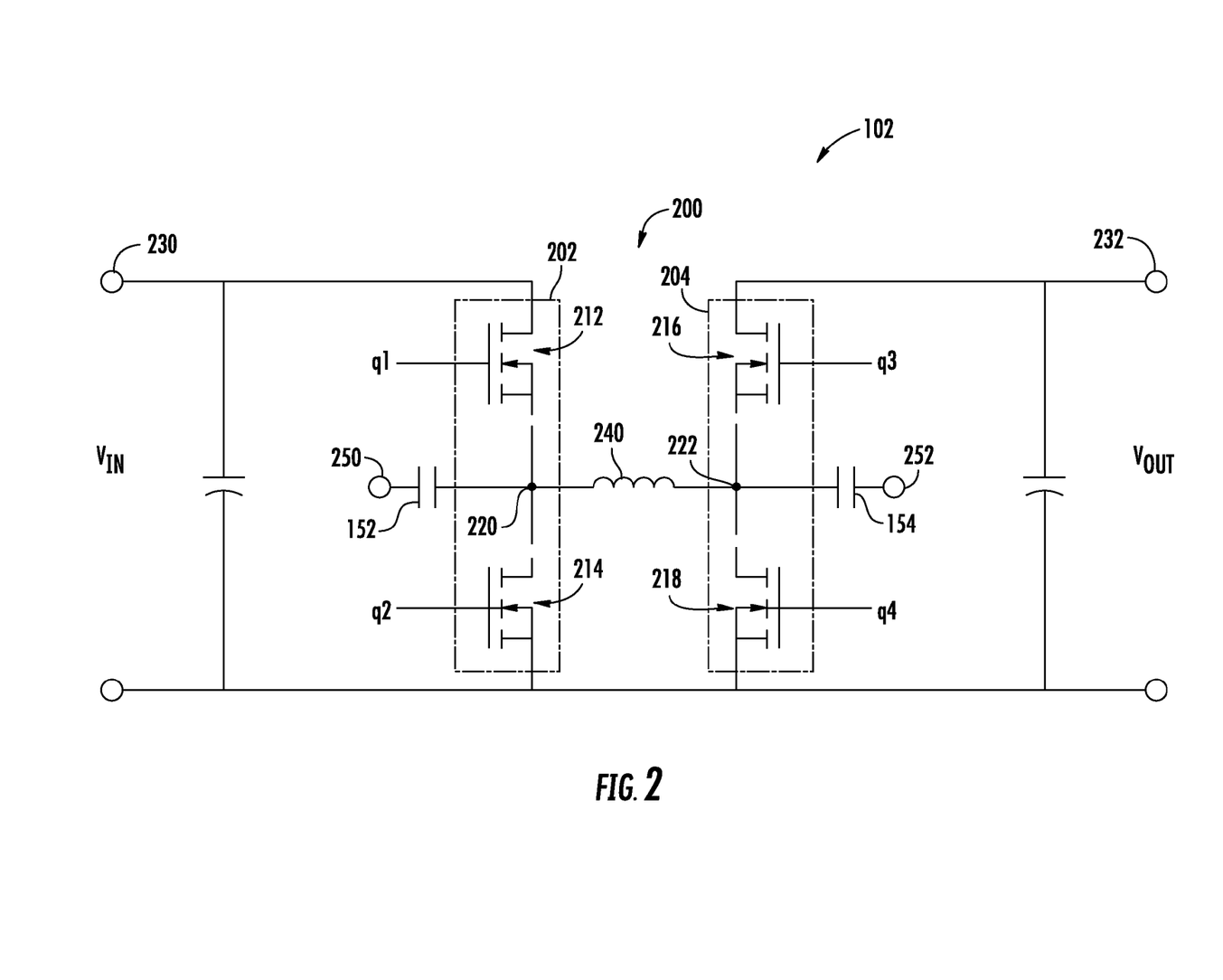
FIG. 2 is a simplified circuit diagram of one embodiment of a buck-boost circuit of the converter of FIG. 1.

Referring now to FIG. 2, in one embodiment, the buck-boost circuit 102 is embodied as an H-bridge buck-boost converter 200. The H-bridge buck-boost converter 200 includes an input leg 202 and an output leg 204. The input leg 202 includes a high-side buck-mode electronic switch 212 and a low-side buck-mode electronic switch 214 coupled to each other at a buck-mode node 220. Similarly, the output leg 204 includes a high-side boost-mode electronic switch 216 and a low-side boost-mode electronic switch 218 coupled to each other at a boost-mode node 222.

In some embodiments, the electronic switches 212, 214, 216, 218 may be embodied as transistors. For example, in the illustrative embodiment of FIG. 2, electronic switches 212, 214, 216, 218 are embodied as metal-oxide-semiconductor field-effect transistors (MOSFETs), but may be embodied as other types of transistors in other embodiments. The MOSFET transistor 212 includes a drain terminal coupled to an input node 230 and a source terminal coupled to the buck-mode node 220. The MOSFET transistor 214 includes a drain terminal coupled to the buck-mode node 220 and a source terminal coupled to a reference, e.g., ground. The MOSFET transistor 216 includes a drain terminal coupled to an output node 232 and a source terminal coupled to the boost-mode node 222. The MOSFET transistor 218 includes a drain terminal coupled to the boost-mode node 222 and a source terminal coupled to the reference, e.g., ground. Each of the MOSFET transistors 212, 214, 216, 218 includes a gate terminal, which receives a corresponding switching signal, q1, q2, q3, q4 to control the operation thereof. The switching signals q1, q2, q3, q4 are generated by the control circuit 104 as discussed in more detail below.

The H-bridge buck-boost converter 200 also includes an inductor 240 electrically coupled between the buck-mode node 220 and the boost-mode node 222. In use, the inductor 240 stores and discharges energy as needed to maintain the output voltage, Vout, at a desired level. Additionally, as discussed above, the H-bridge buck-boost converter 200 includes the buck-mode bootstrap capacitor 152 and the boost-mode bootstrap capacitor 154. The buck-mode bootstrap capacitor 152 includes a first terminal electrically coupled to the buck-mode node 220 and a second terminal electrically coupled to a buck-mode power supply node 250, which receives power from the bootstrap capacitor voltage regulator circuit 106 (see FIG. 3). Similarly, the boost-mode bootstrap capacitor 154 includes a first terminal electrically coupled to the boost-mode node 222 and a second terminal electrically coupled to a boost-mode power supply node 252, which also receives power form the bootstrap capacitor voltage regulator circuit 106 (see FIG. 3).

In use, the control circuit 104 is configured to generate the switching signals, q1, q2, q3, q4, supplied to the MOSFET transistors 212, 214, 216, 218 to control operation of the buck-boost circuit 102. For example, the control circuit 104 controls the mode of operation (i.e., buck mode or boost mode) of the buck-boost circuit 102 based on the switching signals, q1, q2, q3, q4. That is, during the buck mode of operation, the control circuit 104 "turns on" the MOSFET transistor 216, "turns off" the MOSFET transistor 218, and switches MOSFET transistors 212, 214 as required to generate the desired buck voltage output, Vout, similar to a typical buck converter. Conversely, during the boost mode of operation, the control circuit 104 "turns on" the MOSFET transistors 212, "turns off" the MOSFET transistors 214, and switches MOSFET transistors 216, 218 as required to generate the desired boost voltage output, Vout, similar to a typical boost converter.

It should be appreciated that the bootstrap capacitors 152, 154 are used to maintain the gate voltages of the high-side switches 212, 216 at or above a reference level to ensure proper switching functionality of the switches 212, 216. For example, in embodiments wherein the input voltage, Vin, equals the switching voltage of the switching signals, q1, q3, the gate and drain voltage of the high-side switches 212, 216 would be equal causing the high-side switches 212, 216 to immediately "turn off." As such, the bootstrap capacitors 152, 154 are used to ensure that the gate voltage of the high-side switches 212, 216 is greater than the drain voltage of the high-side switches 212, 216 by an amount substantially equal to the voltage of the respective bootstrap capacitors 152, 154.

Figure 3:
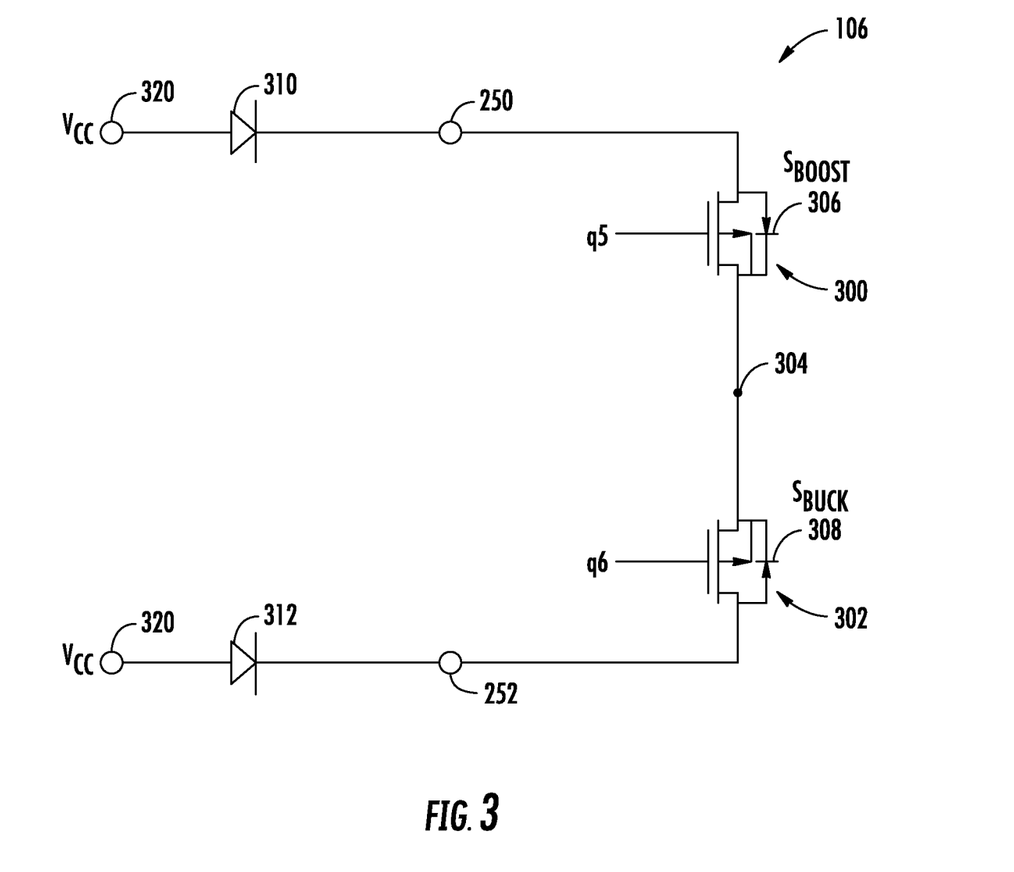
FIG. 3 is a simplified circuit diagram of one embodiment of a bootstrap capacitor voltage regulator circuit of a control circuit of the converter of FIG. 1.

In operation, the voltages of the bootstrap capacitors 152, 154 are maintained by the bootstrap capacitor voltage regulator circuit 106. One embodiment of the voltage regulator circuit 106 is shown in FIG. 3. The illustrative bootstrap capacitor voltage regulator circuit 106 includes a boost-mode switch 300 ("$S_{BOOST}$") and a buck-mode switch 302 ("$S_{BUCK}$") electrically coupled together at a switch node 304. The voltage regulator circuit 106 also includes a diode 306 coupled in parallel with the switch 300 and a diode 308 coupled in parallel with the switch 302. Similar to the switches 212, 214, 216, 218, the switches 300, 302 may be embodied as transistors in some embodiments. For example, in the illustrative embodiment of FIG. 3, the switches 300, 302 are embodied as P-channel MOSFETs and the diodes 306, 308 are embodied as body diodes of the associated MOSFET switch 300, 302. The MOSFET switch 300 includes a drain terminal electrically coupled to the buck-mode power supply node 250 to which the buck-mode bootstrap capacitor 152 is coupled (see FIG. 2) and a source terminal electrically coupled to the node 304. Similarly, the MOSFET switch 302 includes a drain terminal electrically coupled to the boost-mode power supply node 252 to which the boost-mode bootstrap capacitor 154 is coupled (see FIG. 2) and a source terminal electrically to the node 304. The diode 306 includes an anode terminal electrically coupled to the buck-mode power supply node 250 and a cathode terminal electrically coupled to the node 304. Similarly, the diode 308 includes a cathode terminal electrically coupled to the boost-mode power supply node 252 and a cathode terminal electrically coupled to the node 304. Each of the switches 300, 302 includes a gate terminal receiving a corresponding switching signal, q5, q6, which is generated by the voltage comparator circuit 108 (see FIG. 4) to control operation of the switches 300, 302 as discussed below.

The bootstrap capacitor voltage regulator circuit 106 includes a diode 310 coupled to a voltage supply input 320, which may be supplied by a voltage supply or voltage supply circuit of the control circuit 104 or other circuit, and the buck-mode power supply node 250. The bootstrap capacitor voltage regulator circuit 106 also includes a diode 312 coupled to the voltage supply input 320 and the boost-mode power supply node 252. The diode 310 includes an anode terminal coupled to the voltage supply input 320 and a cathode terminal coupled to the buck-mode power supply node 250 to supply voltage thereto. Similarly, the diode 312 includes an anode terminal coupled to the voltage supply input 320 and a cathode terminal coupled to the boost-mode power supply node 252 to supply voltage thereto.

During the buck mode of operation of the buck-boost circuit 102 in which the buck-mode node 220 is switching between high and low, the buck-mode bootstrap capacitor 152 is charged via the voltage supply, Vcc. However, during boost mode operation of the buck-boost circuit 102, the buck-mode node 220 is held at the input voltage, Vin (i.e., the electronic switch 212 is "turned on"). As such, the buck-mode bootstrap capacitor 152 may loose charge or otherwise not be sufficiently charged during the boost mode of operation. The control circuit 104 (i.e., the voltage comparator circuit 108 of FIG. 4) monitors the voltage level of the buck-mode bootstrap capacitor 152 during boost mode operation and, if the voltage level of the buck-mode bootstrap capacitor 152 drops below a reference threshold, "turns on" the boost-mode switch 300 to transfer energy from the boost-mode bootstrap capacitor 154 to the buck-mode bootstrap capacitor 152 via the switch 300 and the forward-biased diode 308.

Similarly, during the boost mode of operation in which the boost-mode node 222 is switching between high and low, the boost-mode bootstrap capacitor 154 is charged via the voltage supply, Vcc. However, during buck mode operation of the buck-boost circuit 102, the boost-mode node 222 is held at the output voltage, Vout (i.e., the electronic switch 216 is in a constant on or closed state). As such, the boost-mode bootstrap capacitor 154 may loose charge or otherwise not be sufficiently charged during the buck mode of operation. The control circuit 104 (i.e., the voltage comparator circuit 108 of FIG. 4) monitors the voltage level of the boost-mode bootstrap capacitor 154 during buck mode operation and, if the voltage level of the boost-mode bootstrap capacitor 154 drops below a reference threshold, "turns on" the buck-mode switch 302 to transfer energy from the buck-mode bootstrap capacitor 152 to the boost-mode bootstrap capacitor 154 via the switch 302 and the forward-biased diode 306. In this way, the voltage of the bootstrap capacitors 152, 154 are maintained above reference thresholds regardless in each mode of operation of the buck-boost circuit 102.

Figure 4:
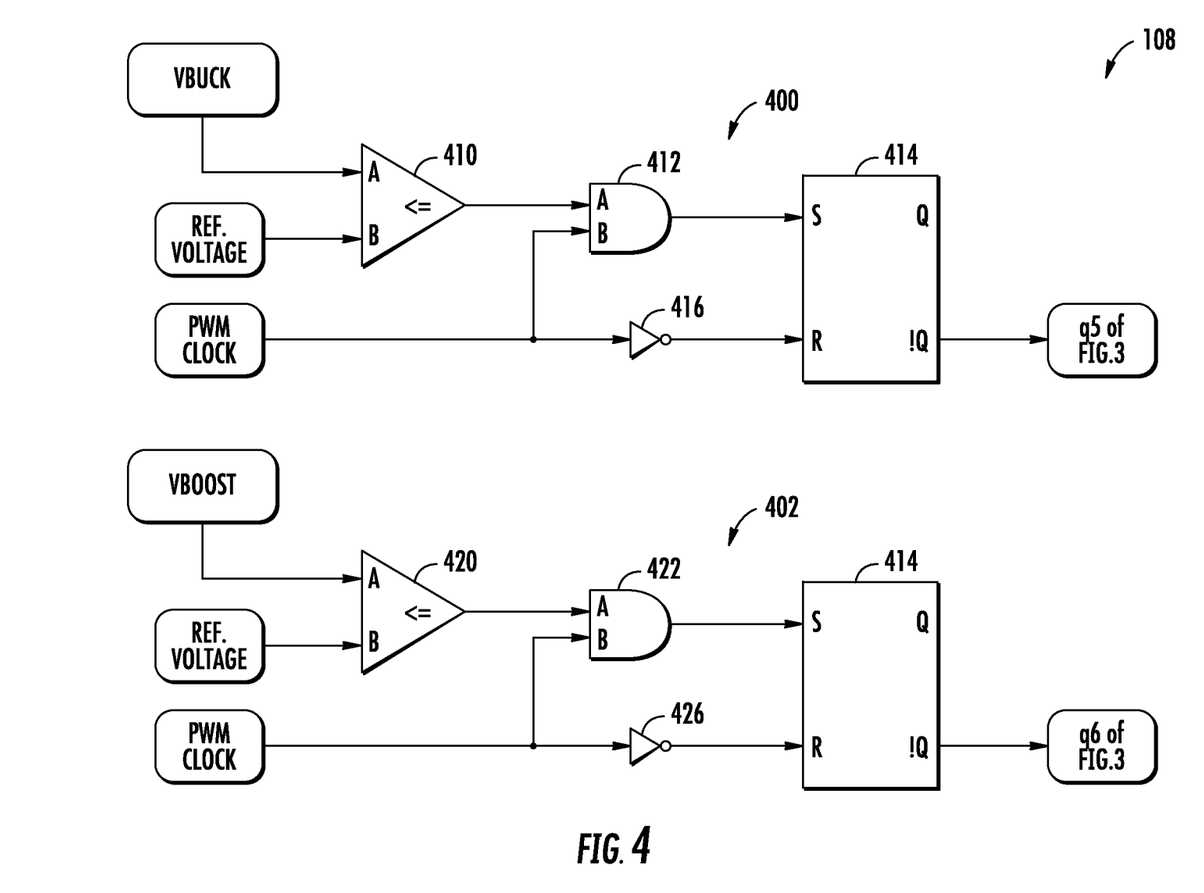
FIG. 4 is a simplified circuit diagram of one embodiment of a voltage comparator circuit of the control circuit of the converter of FIG. 1.

As discussed above, the voltages of the bootstrap capacitors 152, 154 are monitored by the voltage comparator circuit 108, which generates the switching signals, q5, q6, to the bootstrap capacitor voltage regulator circuit 106 to transfer energy between the bootstrap capacitors 152, 154 as required to maintain the capacitor voltages above the corresponding reference voltages. One embodiment of the voltage comparator circuit 108 is shown in FIG. 4. The illustrative voltage comparator circuit 108 includes a buck-mode voltage comparator circuit 400 configured to monitor the voltage of the buck-mode bootstrap capacitor 152 and a boost-mode voltage comparator circuit 402 configured to monitor the voltage of the boost-mode bootstrap capacitor 154.

The buck-mode voltage comparator circuit 400 includes a comparator 410 having a first input ("A") to receive the voltage level of the buck-mode bootstrap capacitor 152, Vbuck, and a second input ("B") to receive the reference voltage level (e.g., 12 volts). The comparator 410 is configured to generate a "true," or high-level, output signal if the voltage level of the buck-mode bootstrap capacitor 152 is less than or equal to the reference voltage level. The output of the comparator 410 is provided to a first input ("A") of an AND logical block 412. The AND logical block 412 also has a second input ("B") to receive a pulse width modulated (PWM) clock signal so as to sync the switching of the buck-mode switch 302 with the switching of the switches 212, 214, 216, 218 of the buck-boost circuit 102. The PWM clock signal may be generated using any suitable PWM circuit, which may be included in the control circuit 104.

The output of the AND logical block 412 is provided to a Set input ("S") of a Set-Reset (S-R) flip-flop 414. The PWM clock signal is also provided to an input of a NOT logical block 416, which has an output coupled to the Reset input (R) of the S-R flip-flop 414. The inverting output, !Q, of the S-R flip-flop 414 provides the switching signal, q6, to the buck-mode switch 302 of the bootstrap capacitor voltage regulator circuit 106. As discussed above, the switching signal, q5, is synchronized with the switching of the switches 212, 214, 216, 218 of the buck-boost circuit 102 via use of the PWM clock signal. Of course, it should be appreciated that in embodiments in which the buck-mode switch 302 is embodied as a P-type MOSFET, the non-inverting output, Q, of the S-R flip-flop 414 may be used.

The boost-mode voltage comparator circuit 402 is substantially similar to the buck-mode voltage comparator circuit 400. The boost-mode voltage comparator circuit 402 includes a comparator 420 having a first input ("A") to receive the voltage level of the boost-mode bootstrap capacitor 154, Vboost, and a second input ("B") to receive the reference voltage level (e.g., 12 volts), which may be equal to or different from the reference voltage level of the buck-mode voltage comparator circuit 400. The comparator 420 is configured to generate a "true," or high-level, output signal if the voltage level of the boost-mode bootstrap capacitor 154 is less than or equal to the reference voltage level. The output of the comparator 420 is provided to a first input ("A") of an AND logical block 422. The AND logical block 422 also has a second input ("B") to receive the pulse width modulated (PWM) clock signal so as to sync the switching of the boost-mode switch 300 with the switching of the switches 212, 214, 216, 218 of the buck-boost circuit 102.

The output of the AND logical block 412 is provided to a Set input ("S") of a Set-Reset (S-R) flip-flop 424. The PWM clock signal is also provided to an input of a NOT logical block 426, which has an output coupled to the Reset input (R) of the S-R flip-flop 424. The inverting output, !Q, of the S-R flip-flop 424 provides the switching signal, q5, to the boost-mode switch 300 of the bootstrap capacitor voltage regulator circuit 106. As discussed above, the switching signal, q5, is synchronized with the switching of the switches 212, 214, 216, 218 of the buck-boost circuit 102 via use of the PWM clock signal. Again, it should be appreciated that in embodiments in which the boost-mode switch 300 is embodied as a P-type MOSFET, the non-inverting output, Q, of the S-R flip-flop 424 may be used.

Figure 5:
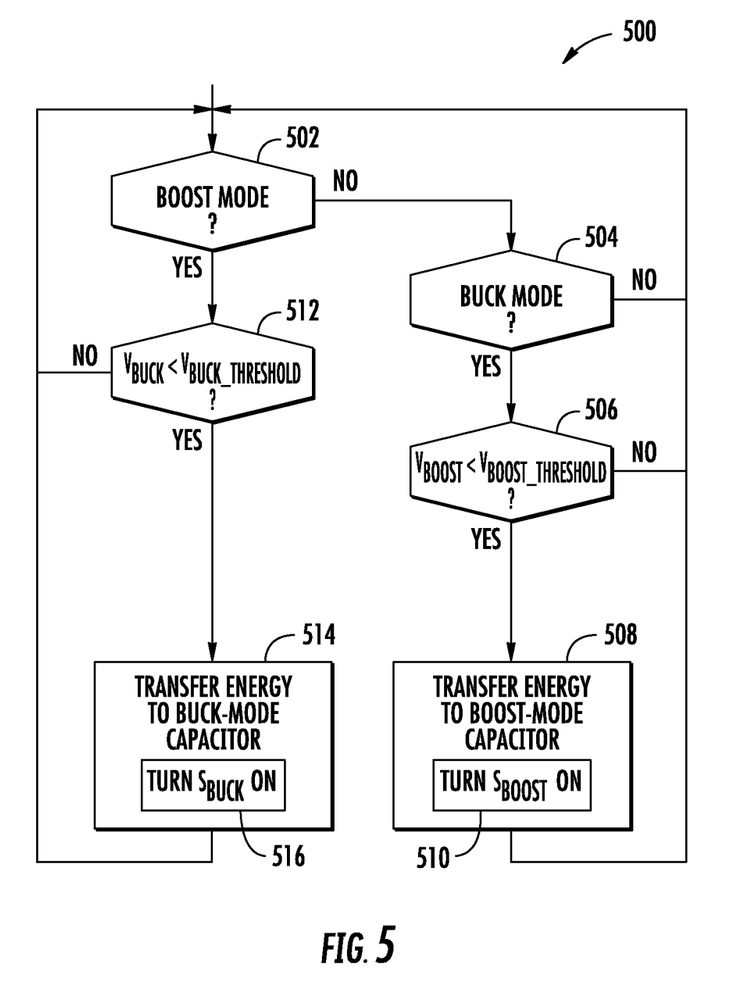
FIG. 5 is a simplified flow chart of one embodiment of a method for controlling the converter of FIG. 1.

Referring now to FIG. 5, in operation, the control circuit 104 may execute a method 500 for controlling the buck-boost circuit 102. The method 500 begins with block 502 in which the control circuit 104 determines whether the buck-boost circuit 102 is operating in a boost mode of operation. If not, the method 500 advances to block 504 in which the control circuit 104 determines whether the buck-boost circuit 102 is operating in a buck mode of operation. If not, the method 500 loops back to block 502. However, if the control circuit 104 determines that the buck-boost circuit 102 is operating in a buck mode of operation in block 504, the method 500 advances to block 506 in which the control circuit 104 senses or otherwise determines the voltage level of the boost-mode bootstrap capacitor 154, Vboost, of the buck-boost circuit 102. If the voltage level of the boost-mode bootstrap capacitor 154, Vboost, is greater than a reference threshold voltage, Vboost_threshold, the method 500 loops back to block 502. However, if the voltage level of the boost-mode bootstrap capacitor 154, Vboost, is less than the reference threshold voltage, Vboost_threshold, the method 500 advances to block 508. In block 508, the control circuit 104 controls the operation of the bootstrap capacitor voltage regulator circuit 106 to transfer energy from the buck-mode bootstrap capacitor 152 to the boost-mode bootstrap capacitor 154. To do so, the control circuit 104 "turns on" the buck-mode switch 302 of the bootstrap capacitor voltage regulator circuit 106 to electrically couple the buck-mode bootstrap capacitor 152 to the boost-mode bootstrap capacitor 154 via the switch 302 and the forward-biased diode 306.

Referring back to block 502, if the control circuit 104 determines that the buck-boost circuit 102 is operating in a boost mode, the method 500 advances to block 512 in which the control circuit 104 senses or otherwise determines the voltage level of the buck-mode capacitor 152, Vbuck, of the buck-boost circuit 102. If the voltage level of the buck-mode capacitor 152, Vbuck, is greater than a reference threshold voltage, Vbuck_threshold, the method 500 loops back to block 502. However, if the voltage level of the buck-mode capacitor 152, Vbuck, is less than the reference threshold voltage, Vbuck_threshold, the method 500 advances to block 514. In block 514, the control circuit 104 controls the operation of the bootstrap capacitor voltage regulator circuit 106 to transfer energy from the boost-mode bootstrap capacitor 154 to the buck-mode bootstrap capacitor 152. To do so, the control circuit 104 turns on the boost-mode switch 300 of the bootstrap capacitor voltage regulator circuit 106 to electrically couple the boost-mode bootstrap capacitor 154 to the buck-mode bootstrap capacitor 152 via the switch 300 and the forward-biased diode 306.

Figure 6:
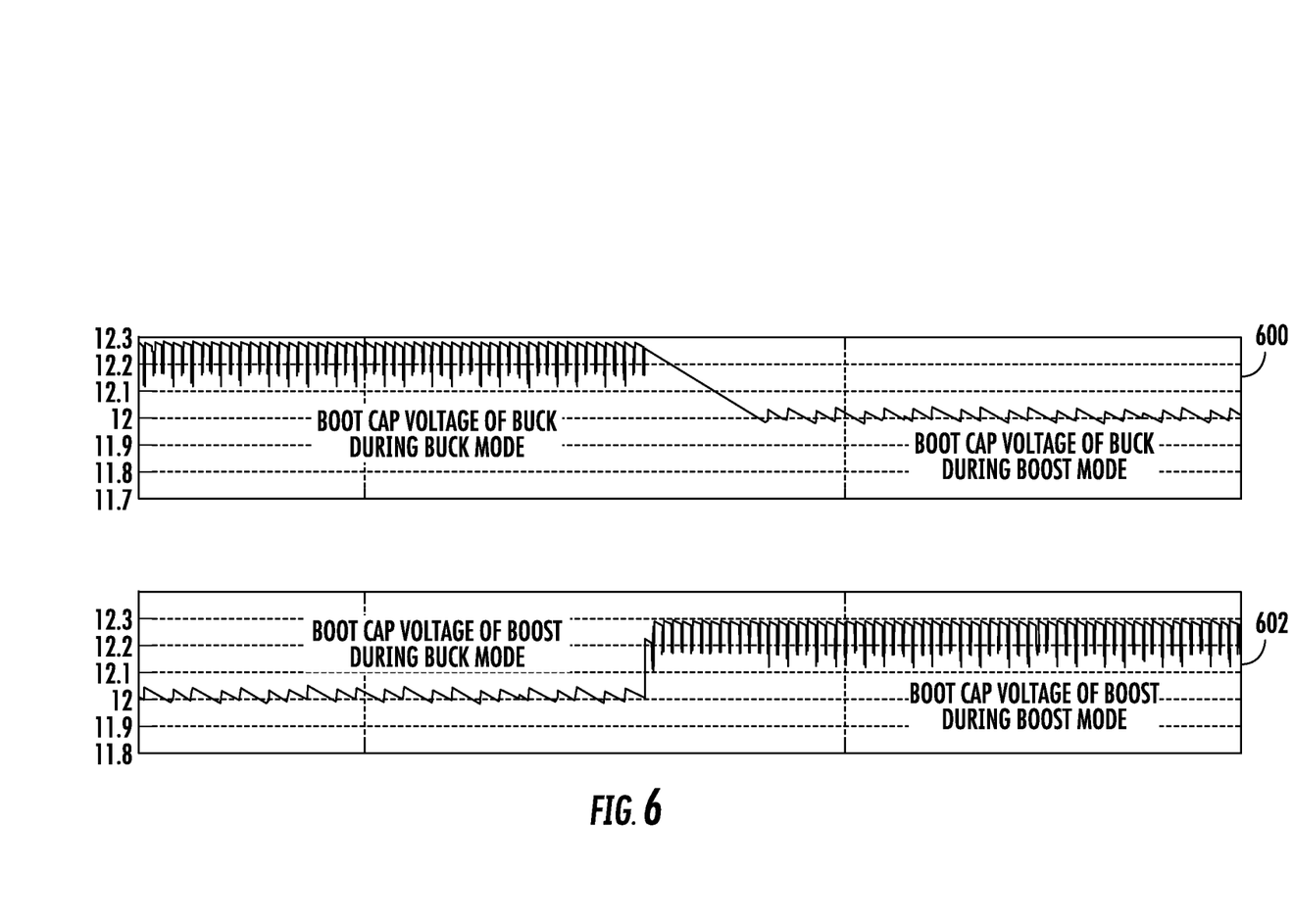
FIG. 6 is a simplified graph of various voltage levels of the converter of FIG. 1 during operation.

Referring now to FIG. 6, a graph 600 illustrates the voltage, Vbuck, of the buck-mode bootstrap capacitor 152 during the buck mode of operation of the converter 100 (left side of graph) and during the boost mode of operation of the converter 100 (right side of graph). In the illustrative embodiment, the reference voltage level, Vbuck_threshold, is set to about 12 volts such that the voltage of the buck-mode capacitor 152, Vbuck, is maintained at a voltage level greater than 12 volts during the boost mode of operation of the converter 100. Similarly, a graph 602 illustrates the voltage of the boost-mode bootstrap capacitor 154, Vboost, during the buck mode of operation of the converter 100 (left side of graph) and during the boost mode of operation of the converter 100 (right side of graph). Again, in the illustrative embodiment, the reference voltage level, Vboost_threshold, is set to about 12 volts such that the voltage of the boost-mode bootstrap capacitor 154, Vboost, is maintained at a voltage level greater than 12 volts during the buck mode of operation of the converter 100.

Figure 7:
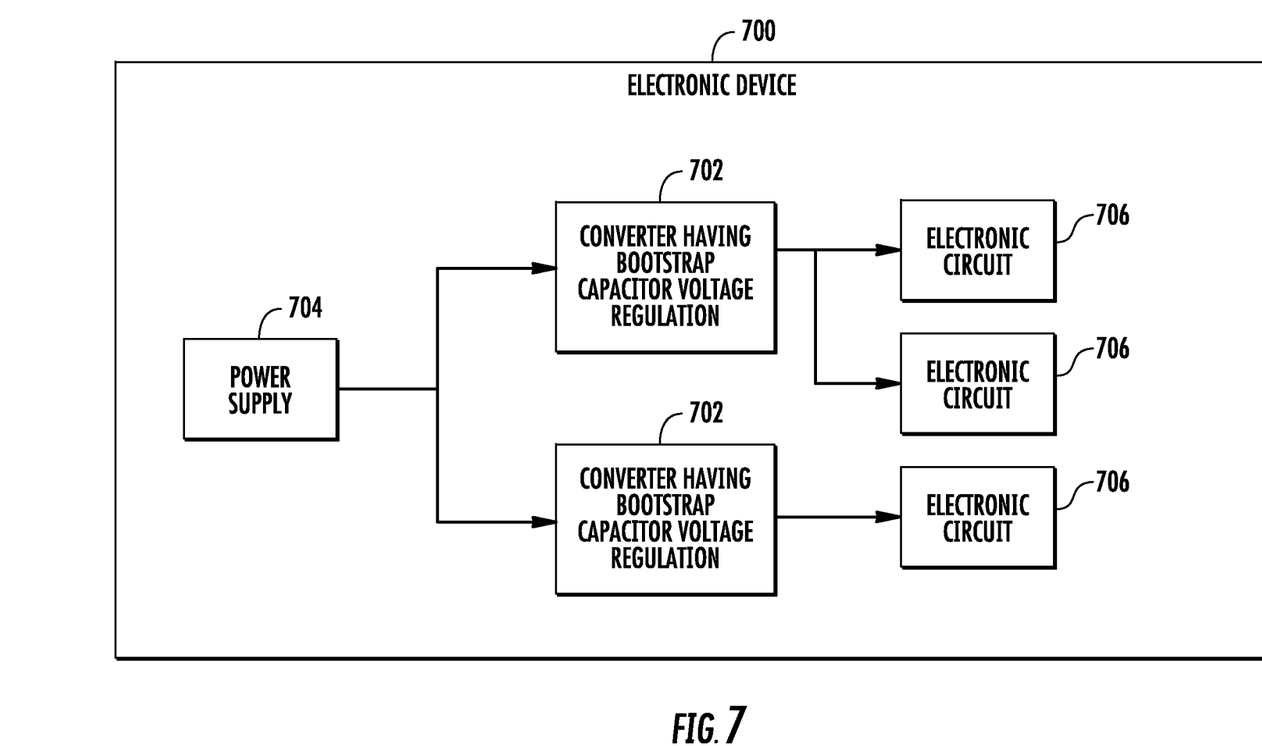
FIG. 7 is a simplified block diagram of one embodiment of an electronic device incorporating the converter of FIG. 1.

Referring now to FIG. 7, an electronic device 700 may include one or more converters 702 having bootstrap capacitor voltage regulation, each of which may be embodied as any one of the embodiments of the converter 100 illustrated in and described above in regard to FIGS. 1-6. The converter(s) 702 provide one or more operating voltages to sub-circuits or components of the electronic device 700. The electronic device 700 may be embodied as any type of electronic device requiring voltages of various levels including, for example, a desktop computer, a laptop, a mobile internet device, a smart phone, a personal digital assistant, a telephony device, a consumer electronic device, or other type of electronic device. The electronic device 700 may include any number of converters 702 to provide operating voltages of various levels. For example, the illustrative electronic device 700 includes two converters 702, but may include more or fewer converters 702 in other embodiments.

Each of the converters 702 receives a voltage input, Vin, from a power supply 704 of the electronic device 700. The power supply 704 may be embodied as any type of power supply for supplying power to the converters 702 and, in some embodiments, other components of the electronic device. For example, the power supply 704 may be embodied as one or more batteries, power supply circuits, and/or the like. Each of the converters 702 supplies power to one or more electronic circuits 706. Each electronic circuit 706 may be embodied as any type of electronic circuit of the electronic device 700 such as, for example, processing circuitry, input/output circuitry, communication circuitry, and/or any other type of circuit or electronic component of the electronic device 700 requiring a supply voltage having a magnitude different from the voltage magnitude of the power supply 704.

In use, as discussed in detail above in regard to the converter 100, each converter 702 is configured to convert the input voltage, Vin, to an output voltage, Vout, having a magnitude different from the input voltage as required by the corresponding electronic circuit 706. In some implementations, a single converter 702 may provide power to multiple electronic circuits 706, either simultaneously or multiplexed at various time intervals. Alternatively, a converter 702 may supply power to a single electronic circuit 706. The power supplied by the converter 702 may have a fixed voltage magnitude (e.g., a constant voltage level) or may have a varying voltage magnitude dependent on various operating conditions and/or criteria of the electronic device. Of course, because the converter 702 is capable of operating in a buck-mode or a boost-mode, each converter 702 may supply a power at a voltage magnitude greater than or less than the voltage magnitude of the power supply 704 as required by the corresponding electronic circuit 706. Additionally, it should be appreciated that although electronic device 700 includes multiple converters 702, a single control circuit (e.g. control circuit 104) may be used to control each of the buck-boost circuits (e.g., buck-boost circuits 102) of the converter 702 in some embodiments.

There is a plurality of advantages of the present disclosure arising from the various features of the apparatuses, circuits, and methods described herein. It will be noted that alternative embodiments of the apparatuses, circuits, and methods of the present disclosure may not include all of the features described yet still benefit from at least some of the advantages of such features. Those of ordinary skill in the art may readily devise their own implementations of the apparatuses, circuits, and methods that incorporate one or more of the features of the present disclosure and fall within the spirit and scope of the present invention as defined by the appended claims.

The invention claimed is:

1. A control circuit to control operation of a buck-boost circuit, the control circuit comprising:
   a bootstrap capacitor voltage regulator circuit electrically coupled to a buck-mode bootstrap capacitor of the buck-boost circuit and to a boost-mode bootstrap capacitor of the buck-boost circuit; and
   a comparator circuit electrically coupled to the buck-mode bootstrap capacitor and the boost-mode bootstrap capacitor, the comparator circuit configured (i) to control the bootstrap capacitor voltage regulator circuit to maintain a voltage of the buck-mode bootstrap capacitor above a first reference voltage during a boost mode of the buck-boost circuit and (ii) to control the bootstrap capacitor voltage regulator circuit to maintain a voltage of the boost-mode bootstrap capacitor above a second reference voltage during a buck mode of the buck-boost circuit.

2. The control circuit of claim 1, wherein the bootstrap capacitor voltage regulator circuit comprises:
   a first electronic switch having a first terminal electrically coupled to the buck-mode bootstrap capacitor and a second terminal electrically coupled to a first node,
   a first diode electrically coupled in parallel with the first electronic switch,
   a second electronic switch having a first terminal electrically coupled to the boost-mode bootstrap capacitor and a second terminal electrically coupled to the first node, and
   a second diode coupled in parallel with the fourth electronic switch.

3. The control circuit of claim 2, wherein the comparator circuit is configured to generate switching signals to control the operation of the first electronic switch and the second electronic switch to:
   (i) close the first electronic switch and (ii) open the second electronic switch in response to the voltage of the buck-mode bootstrap capacitor being less than the first reference voltage during the boost mode of the buck-boost circuit, and (i) close the second electronic switch and (ii) open the first electronic switch in response to the voltage of the boost-mode bootstrap capacitor being less than the second reference voltage during the buck-mode of the buck-boost circuit.

4. The control circuit of claim 3, wherein the comparator circuit comprises:
a first voltage comparator configured to compare the voltage of the buck-mode bootstrap capacitor to the first reference voltage and a first flip-flop to generate a first switching signal to control the first electronic switch, and
a second voltage comparator to compare the voltage of the boost-mode bootstrap capacitor to the second reference voltage and a second flip-flop to generate a second switching signal to control the second electronic switch.

5. The control circuit of claim 2, wherein the bootstrap capacitor voltage regulator circuit further comprises:
a third diode having an anode coupled to a power supply voltage and a cathode coupled to the first terminal of the third electronic switch, and
a fourth diode having an anode coupled to the power supply voltage and a cathode coupled to the first terminal of the fourth electronic switch.

6. The control circuit of claim 2, wherein the first electronic switch and the second electronic switch are metal-oxide-semiconductor field effect transistors (MOSFETs), the first diode is a body diode of the third electronic switch, and the second diode is a body diode of the fourth electronic switch.

7. The control circuit of claim 6, wherein the first terminal of the first electronic switch is a drain terminal and the second terminal of the first electronic switch is a source terminal, and wherein the first terminal of the second electronic switch is a drain terminal and the second terminal of the second electronic switch is a source terminal.

8. The control circuit of claim 2, wherein:
the first diode comprises an anode electrically coupled to the first terminal of the first electronic switch and a cathode coupled to the first node, and
the second diode comprises an anode electrically coupled to the first terminal of the second electronic switch and a cathode coupled to the third node.

9. The control circuit of claim 1, wherein the comparator circuit is configured to:
sense the voltage of the buck-mode bootstrap capacitor and, in response to the voltage of the buck-mode bootstrap capacitor being less than the first reference voltage, control the bootstrap capacitor voltage regulator circuit to transfer an amount of energy from the boost-mode bootstrap capacitor to the buck-mode bootstrap capacitor during the boost mode of the buck-boost converter, and
sense the voltage of the boost-mode bootstrap capacitor and, in response to the voltage of the boost-mode bootstrap capacitor being less than the second reference voltage, control the bootstrap capacitor voltage regulator circuit to transfer an amount of energy from the buck-mode bootstrap capacitor to the boost-mode bootstrap capacitor during the buck mode of the buck-boost converter.

10. The control circuit of claim 9, wherein the second reference voltage is different from the first reference voltage.

11. A method for controlling the operation of a buck-boost circuit to convert an input voltage to an output voltage, the buck-boost circuit including a buck-mode bootstrap capacitor and a boost-mode bootstrap capacitor, the method comprising:
sensing a voltage of the buck-mode bootstrap capacitor;
sensing a voltage of the boost-mode bootstrap capacitor;
transferring an amount of energy from the boost-mode bootstrap capacitor to the buck-mode bootstrap capacitor in response to (i) the sensed voltage of the buck-mode bootstrap capacitor being less than a first reference voltage and (ii) the buck-boost converter operating in a boost mode, and
transferring an amount of energy from the buck-mode bootstrap capacitor to the boost-mode bootstrap capacitor in response to (i) the voltage of the boost-mode bootstrap capacitor being less than a second reference voltage and (ii) the buck-boost converter operating in a buck mode.

12. The method of claim 11, wherein:
transferring an amount of energy from the boost-mode bootstrap capacitor to the buck-mode bootstrap capacitor comprises controlling the operation of a first electronic switch to electrically couple the boost-mode bootstrap capacitor to the buck-mode bootstrap capacitor, and
transferring an amount of energy from the buck-mode bootstrap capacitor to the boost-mode bootstrap capacitor comprises controlling the operation of a second electric switch to electrically couple the buck-mode bootstrap capacitor to the boost-mode bootstrap capacitor.

13. The method of claim 12, wherein:
controlling the operation of the first electronic switch comprises closing the third electronic switch in sync with the boost mode of the buck-boost converter, and
controlling the operation of the second electronic switch comprises closing the fourth electronic switch in sync with the buck mode of the buck-boost converter.

14. The method of claim 12, wherein:
controlling the operation of the first electronic switch comprises closing the first electronic switch to transfer the amount of energy from the boost-mode bootstrap capacitor to the buck-mode bootstrap capacitor via the first electronic switch and a body diode of the second electronic switch, and
controlling the operation of the second electronic switch comprises closing the second electronic switch to transfer the amount of energy from buck-mode bootstrap capacitor to the boost-mode bootstrap capacitor via the second electronic switch and a body diode of the first electronic switch.

15. The method of claim 11, wherein the first reference voltage is substantially equal to the second reference voltage.

16. A converter comprising:
an H-bridge buck-boost converter circuit comprising (i) a high-side buck-mode switch, low-side buck-mode switch, and a buck-mode bootstrap capacitor electrically coupled to the high-side buck-mode switch and the low-side buck-mode switch and (ii) a high-side boost-mode switch, a low-side boost-mode switch, and a boost-mode bootstrap capacitor electrically coupled to the high-side boost-mode switch and the low-side boost-mode switch; and
a control circuit electrically coupled to the H-bridge buck-boost converter circuit to maintain a voltage of the buck-mode bootstrap capacitor above a first reference voltage during a boost mode of operation of the H-bridge buck-boost converter circuit and maintain a voltage of the boost-mode bootstrap capacitor above a second reference voltage during a buck mode of operation of the H-bridge buck-boost converter circuit.

17. The converter of claim 16, wherein the control circuit is configured to:
  maintain the voltage of the buck-mode bootstrap capacitor by transferring an amount of energy from the boost-mode bootstrap capacitor to the buck-mode bootstrap capacitor in response to the voltage of the buck-mode bootstrap capacitor being below the first reference voltage, and
  maintain the voltage of the boost-mode bootstrap capacitor by transferring an amount of energy from the buck-mode bootstrap capacitor to the boost-mode bootstrap capacitor in response to the voltage of the boost-mode bootstrap capacitor being below the second reference voltage.

18. The converter of claim 16, wherein the control circuit comprises
  a bootstrap capacitor voltage regulator circuit having a first output electrically coupled to the buck-mode bootstrap capacitor and a second output electrically coupled to the boost-mode bootstrap capacitor; and
  a voltage comparator circuit electrically coupled to the H-bridge buck-boost converter circuit and the bootstrap capacitor voltage regulator circuit to:
  sense the voltage of the buck-mode bootstrap capacitor and, in response to the voltage of the buck-mode bootstrap capacitor being less than the first reference voltage, control the bootstrap capacitor voltage regulator circuit to transfer an amount of energy from the boost-mode bootstrap capacitor to the buck-mode bootstrap capacitor during the boost mode of operation of the buck-boost converter, and
  sense the voltage of the boost-mode bootstrap capacitor and, in response to the voltage of the boost-mode bootstrap capacitor being less than the second reference voltage, control the bootstrap capacitor voltage regulator circuit to transfer an amount of energy from the buck-mode bootstrap capacitor to the boost-mode bootstrap capacitor during the buck mode of operation of the buck-boost converter.

19. An electronic device comprising:
  a power supply circuit configured to generate a supply voltage;
  a converter electrically coupled to the power supply to convert the supply voltage to a converted supply voltage having a voltage magnitude different from the supply voltage, the converter comprising (i) a buck-boost converter circuit including a buck-mode bootstrap capacitor and a boost-mode bootstrap capacitor and (ii) a control circuit electrically coupled to the buck-boost converter circuit to maintain a voltage of the buck-mode bootstrap capacitor above a first reference voltage during a boost mode of the buck-boost converter circuit and maintain a voltage of the boost-mode bootstrap capacitor above a second reference voltage during a buck mode of the buck-boost converter circuit; and
  an electronic circuit having an input electrically coupled to the converter to receive the converted supply voltage.

20. The electronic device of claim 19, wherein the control circuit is configured to:
  maintain the voltage of the buck-mode bootstrap capacitor by transferring an amount of energy from the boost-mode bootstrap capacitor to the buck-mode bootstrap capacitor, and
  maintain the voltage of the boost-mode bootstrap capacitor by transferring an amount of energy from the buck-mode bootstrap capacitor to the boost-mode bootstrap capacitor.

* * * * *